United States Patent
Fagan et al.

(10) Patent No.: US 7,118,191 B2
(45) Date of Patent: Oct. 10, 2006

(54) APPARATUS AND METHOD FOR INK JET PRINTING USING VARIABLE INTERLACING

(75) Inventors: Mark W. Fagan, Lexington, KY (US); Michael A. Marra, III, Lexington, KY (US); Randall D. Mayo, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 243 days.

(21) Appl. No.: 10/878,838

(22) Filed: Jun. 28, 2004

(65) Prior Publication Data

US 2005/0285898 A1    Dec. 29, 2005

(51) Int. Cl.
*B41J 2/15* (2006.01)
(52) U.S. Cl. ...................................................... 347/41
(58) Field of Classification Search ................ 347/41, 347/43, 15, 16
See application file for complete search history.

(56) References Cited

U.S. PATENT DOCUMENTS

| | | | |
|---|---|---|---|
| 4,272,771 A | 6/1981 | Furukawa | |
| 4,509,058 A | 4/1985 | Fischbeck | |
| 4,855,752 A | 8/1989 | Bergstedt | |
| 5,070,345 A | 12/1991 | Lahut et al. | |
| 5,239,312 A | 8/1993 | Merna et al. | |
| 5,300,950 A | 4/1994 | Lopez et al. | |
| 5,455,610 A | 10/1995 | Harrington | |
| 5,568,168 A | 10/1996 | Watanabe | |
| 5,640,183 A | 6/1997 | Hackleman | |
| 5,734,393 A | 3/1998 | Eriksen | |
| 5,956,056 A | 9/1999 | Kaneko et al. | |
| 5,959,646 A | 9/1999 | Bates et al. | |
| 5,992,962 A | 11/1999 | Yen et al. | |
| 6,019,454 A | 2/2000 | Serra et al. | |
| 6,067,405 A | 5/2000 | Serra | |
| 6,082,849 A | 7/2000 | Chang et al. | |
| 6,142,605 A | 11/2000 | Serra et al. | |
| 6,318,832 B1 | 11/2001 | Bates et al. | |
| 6,508,535 B1 | 1/2003 | Klassen | |
| 6,523,936 B1 | 2/2003 | Zapata et al. | |
| 6,530,645 B1 | 3/2003 | Halfinger | |
| 6,540,315 B1 | 4/2003 | Nystrom et al. | |
| 6,565,191 B1 | 5/2003 | Bolash et al. | |
| 6,612,685 B1 | 9/2003 | Marra, III et al. | |
| 6,874,864 B1* | 4/2005 | Maeda et al. ................. | 347/41 |
| 6,948,797 B1* | 9/2005 | Shepherd et al. ............. | 347/41 |
| 6,991,316 B1* | 1/2006 | Maru et al. .................... | 347/41 |

* cited by examiner

*Primary Examiner*—Lamson Nguyen
(74) *Attorney, Agent, or Firm*—Derek C. Stettner

(57) ABSTRACT

The invention provides an apparatus and method for printing an image using the printhead of an ink jet printer. The printhead ejects ink drops on a print medium in a series of scanning passes, and different addressing patterns are selected in each scanning pass to address ink drop locations for different portions of the raster lines addressed by each scanning pass. Addressing patterns having various interlacing percentages are selected in order to produce overlapping boundary regions between passes. The overlapping boundary regions minimize the banding effects that occur with inexact ink drop placement.

16 Claims, 12 Drawing Sheets

PRIOR ART

Pass 1

Pass 2

Pass 3

Pass 4

VARIABLE INTERLACING

Pass 2

Pass 3

Pass 4

Pass 1

Pass 2

Pass 3

Pass 1

Pass 2

Pass 3

PRIOR ART

Pass 1

Pass 2

Pass 3

VARIABLE INTERLACING

PRIOR ART

Pass 4

Fig. 8(d)

VARIABLE INTERLACING

Fig. 9(d)

Pass 5

PRIOR ART
VARIABLE INTERLACING

Pass 1, addressing odd 600ths horizontally:

Pass 2, after paper index of 7/1200" addressing odd 600ths horizontally:

PRIOR ART            VARIABLE INTERLACING

Pass 3, after advancing paper 5/1200" addressing even 600ths horizontally:

Pass 4, after paper index of 7/1200" addressing even 600ths horizontally:

PRIOR ART

Pass 5

Fig. 10(e)

Pass 6

Fig. 10(f)

VARIABLE INTERLACING

PRIOR ART

Pass 7

Fig. 10(g)

VARIABLE INTERLACING

Fig. 11(g)

Pass 8

APPARATUS AND METHOD FOR INK JET PRINTING USING VARIABLE INTERLACING

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to an apparatus and method for reducing banding artifacts during ink jet printing, in particular, by modulating the swath boundaries of a printhead using variable interlacing percentages.

2. Description of the Related Art

Thermal ink jet printers apply ink to a print medium such as paper by ejecting ink drops from one or more printheads through a column or array of nozzles. The printheads are mounted on a carriage assembly that is movable in a lateral direction across the print medium and ink drops are selectively ejected from the nozzles at corresponding ink drop placement locations. Specifically, each nozzle is associated with a heater resistor that generates heat when sufficient current passes through it, with the generated heat causing ink within an associated ink reservoir to be ejected from the nozzle. The printheads are moved in a series of lateral passes or swaths across the print medium, and between printing passes, the print medium is advanced in a longitudinal or advance direction. Since the printhead moves in a direction that is perpendicular to the advance direction of the print medium, in each pass, each nozzle passes in a linear manner over the print medium. The line associated with each nozzle which overlies the print medium is commonly referred to as a raster or raster line. A plurality of raster lines extending across the image area of the print medium are disposed vertically adjacent to each other in the advance direction.

A printer controller determines which resistors will be "fired" and the proper firing sequence so that a desired image is printed. However, ink drop placement errors can occur due to a number of factors, including incorrect timing or variable ink drop flight time. Further, if the amount that the print medium is advanced between printing passes is not precisely equal to a theoretical advance amount, either adjacent printed lines can overlap, or be visibly distant from one another. These effects of incorrect line spacing are referred to as line continuation errors.

Known methods exist for ameliorating the effects of ink drop placement errors. One such method is known as shingling or interlaced printing. For a two pass shingling mode (i.e., 50% interlace level), approximately 50% of the ink drops are placed on any given printhead pass. The candidate dots in a first pass are selectively addressed according to a checkerboard pattern, with the remaining dots printed on the next pass, after the print medium is advanced. For a printhead with vertically disposed colors, and a raster which contains cyan, magenta and yellow dots, printing at a 50% interlace level requires that the printhead be passed at least six times across each raster line. Employing a shingling method generally improves print quality, while at the same time reducing the printing speed as compared to printing without shingling.

SUMMARY OF THE INVENTION

The invention provides an apparatus and method for printing an image on a print medium by ejecting ink from a plurality of nozzles in a printhead in an ink jet printer to reduce the effects of banding. The print medium is movable in an advance direction, typically along the length of such print medium. The printhead comprises a column of N nozzles, where N is an integer greater than eight, that selectively ejects ink drops onto a printing area of the print medium at a plurality of ink drop locations arranged in a grid. The method includes the steps of performing a series of at least three scanning passes of the printhead is performed, with the print medium being advanced between scanning passes. Each scanning pass comprises moving the column of nozzles across the width of the printing area in a plurality of raster lines for selectively addressing ink drop locations according to an addressing pattern. Each ink drop location is addressed in one of the series of scanning passes, and ink is ejected from a nozzle at an ink drop location during a particular scanning pass according to a corresponding desired image data bit and a corresponding bit of the addressing pattern for that scanning pass. A first addressing pattern is used for a first contiguous portion of the raster lines addressed by the first scanning pass and a second addressing pattern is used for a second contiguous portion of the raster lines addressed by the first scanning pass. The second portion of the raster lines addressed by the first scanning pass corresponds to a lower region of the first scanning pass. Further, the first addressing pattern of the first scanning pass has an interlacing percentage that is greater than an interlacing percentage of the second addressing pattern of the first scanning pass. A second scanning pass having at least a first addressing pattern is used for a first contiguous portion of the raster lines addressed by the second scanning pass. A first addressing pattern is used for a first contiguous portion of the raster lines addressed by the at least third scanning pass and a second addressing pattern is used for a second contiguous portion of raster lines addressed by the at least third scanning pass, wherein the first portion of the raster lines addressed by the at least third scanning pass corresponds to an upper region of the at least third scanning pass. The first addressing pattern of the at least third scanning pass has an interlacing percentage that is less than an interlacing percentage of the second addressing pattern of the at least third scanning pass. Together the at least third scanning pass and the prior scanning passes have addressed each ink drop location in the plurality of raster lines addressed by the first scanning pass. The first scanning pass and the at least third scanning pass define an overlapping boundary region.

Other features and advantages of the invention will become apparent to those skilled in the art upon review of the following detailed description, claims, and drawings.

BRIEF DESCRIPTION OF THE DRAWINGS

FIGS. 8(a)–8(e) illustrate prior art addressing patterns for successive passes of an ink jet printhead;

FIGS. 9(a)–9(e) illustrate addressing patterns for successive passes of an ink jet printhead in another embodiment of the invention;

FIGS. 10(a)–10(h) illustrate prior art addressing patterns for successive passes of an ink jet printhead; and FIGS. 11(a)–11(h) illustrate addressing patterns for successive passes of an ink jet printhead in another embodiment of the invention.

DETAILED DESCRIPTION OF THE PREFERRED EMBODIMENTS

Figure 1:
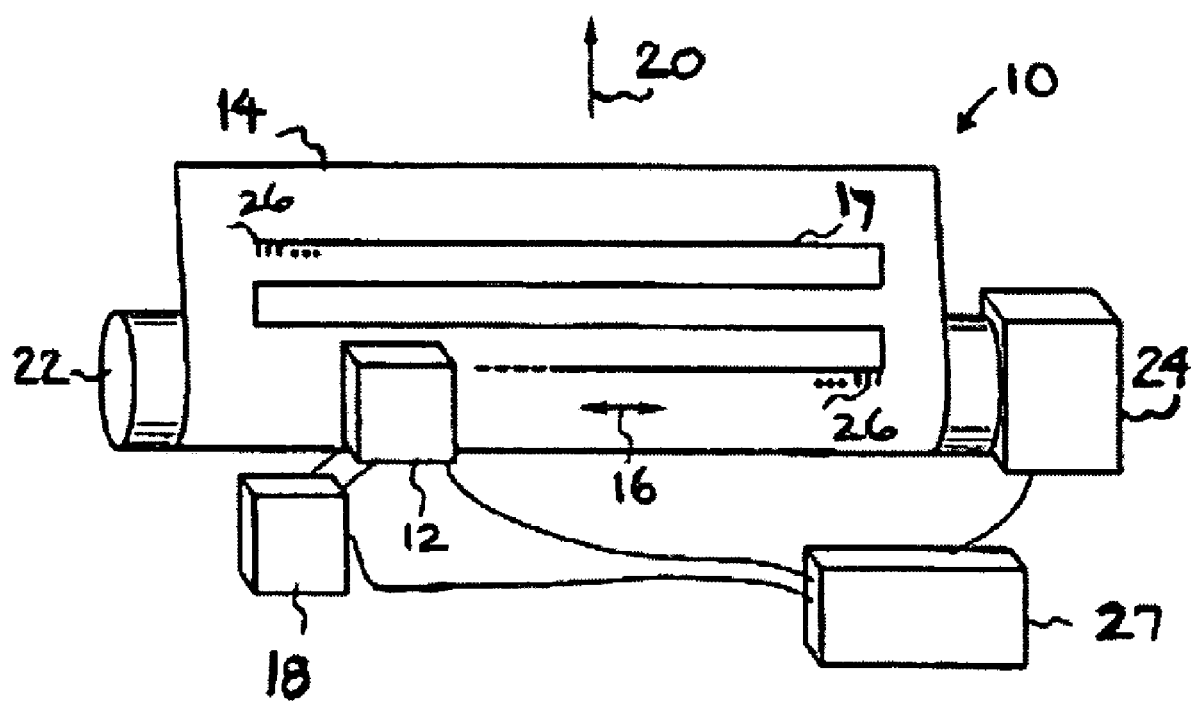
FIG. 1 is a schematic perspective view of a portion of an ink jet printer illustrating a printhead relative to a print medium.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The order of limitations specified in any method claims does not imply that the steps or acts set forth therein must be performed in that order, unless an order is explicitly set forth in the specification. Furthermore, and as described in subsequent paragraphs, the specific mechanical configurations illustrated in the drawings are intended to exemplify embodiments of the invention and that other alternative mechanical configurations are possible. In addition, the terms horizontal and vertical when used with respect to movement of the printhead generally correspond to movement along the width and length, respectively, of the print medium. However, the printhead and or the medium can be positioned such that the printhead moves across the length of the print medium when moving horizontally. Other arrangements for movement of the printhead and print medium relative to one another are left to the artisan.

FIG. 1 illustrates a schematic view of the basic arrangement of an ink jet printer 10 including at least one printhead 12 that is operable to print on print medium 14, such as paper or the like. The printhead 12 includes a plurality of nozzles for ejecting ink drops (see FIG. 2) and is reciprocally moveable in both a forward and reverse print line direction 16 across the print medium in a series of scanning passes 17. The movement of the printhead 12 is controlled by a horizontal scan drive 18. Between passes, the print medium 14 is advanced with respect to the printhead 12 in an advance direction 20 (perpendicular to the print line direction 16) by movement of a print roller 22 under the control of a vertical scan drive 24. During each printing pass, the printhead 12 passes over a plurality of ink drop locations 26 in the form of a grid, and ink drops are selectively ejected. A controller 27 controls the ejection of ink drops from the plurality of nozzles, as described below, as well as the horizontal scan drive 18 and vertical scan drive 24. The controller 27 also stores data corresponding to a desired image to be printed.

Figure 2:
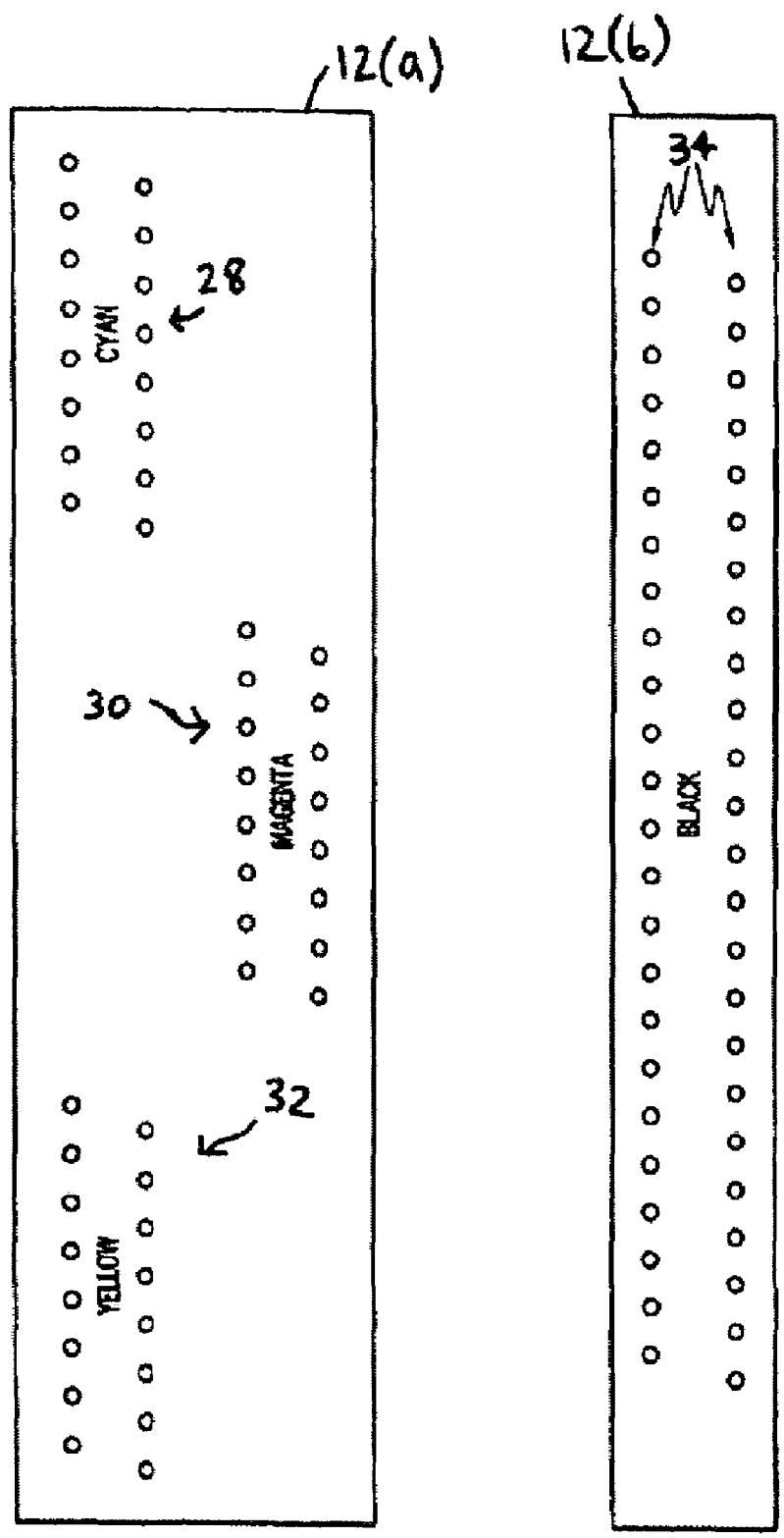
FIG. 2 is a schematic illustration of color and monochrome printheads each having a plurality of nozzles for ejecting ink drops.
Figure 3A:
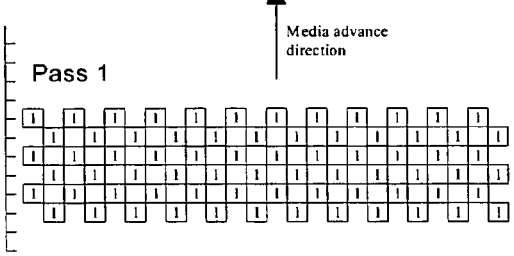
FIGS. 3(a)–3(d) illustrate prior art addressing patterns for successive passes of an ink jet printhead.
Figure 3B:
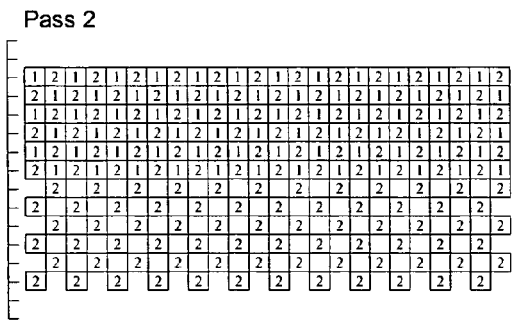
Figure 3C:
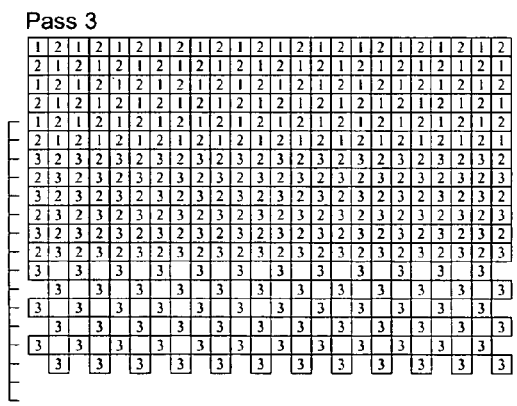
Figure 3D:
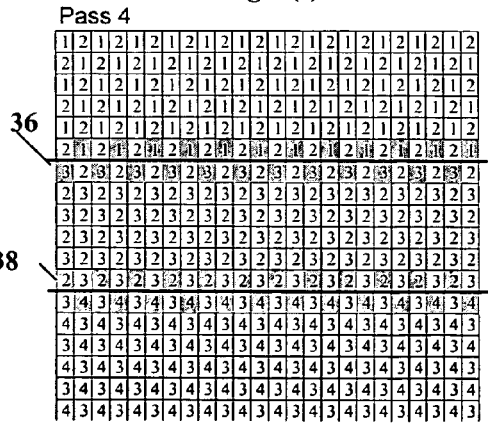

FIG. 2 illustrates in more detail a color printhead 12(a) including three pens for printing three ink colors and a monochrome printhead 12(b) including a black pen for printing black ink. The black pen includes a plurality of nozzles 34 for ejecting ink drops onto a printing area of the print medium at a plurality of ink drop locations arranged in a grid (not shown). Similarly, color printhead 12(a) includes nozzle arrays 28, 30, 32 for depositing three respective colors of ink on the print medium, such as cyan, magenta and yellow. One skilled in the art can appreciate that the number and arrangement of printheads, pens, and nozzles can vary from what is illustrated in FIG. 2.

The method for printing an image using different addressing patterns for different portions of raster lines in a scanning pass will now be described with respect to a single ink color, with the recognition that the same principals are applicable as well to printing using multiple ink colors.

The printhead 12 is controlled to print a desired image in a series of scanning passes across the print medium 14, with the print medium 14 being advanced between passes. The printhead comprises a column of N nozzles (N being an integer greater than eight) arranged to selectively eject ink drops onto a printing area of a print medium at a plurality of ink drop locations. Each scanning pass comprises moving the nozzles horizontally or across the printing area in N raster lines for selectively addressing ink drop locations according to an addressing pattern. Each ink drop location of the printing area is addressed in one of the series of scanning passes. The controller controls the ejection of ink from a nozzle at an ink drop location during a particular scanning pass according to a corresponding desired image data bit and a corresponding bit of the addressing pattern for that scanning pass. The addressing patterns used for each scanning pass produce an overlapping boundary region between, for example, a first scanning pass and a subsequent scanning pass, as more fully explained with reference to the drawings. An overlapping boundary region between particular passes means that a distinct boundary between these passes is not likely to be detected by a viewer of the printed image. Such a region reduces the visible effects of inaccurate ink drop placement, and in particular, the effects of line continuation errors.

Contrasting the method of the invention to prior art interlacing schemes is helpful. For example, FIGS. 3(a)–3(d) illustrate a prior art method for printing in a series of scanning passes and selectively ejecting ink from the printhead nozzles. In this and subsequent figures, the boxes represent ink drop locations, a row of boxes represents a raster line, and the number in each box represents which scanning pass addresses that ink drop location. During a particular scanning pass, an ink drop is ejected from a corresponding nozzle at an ink drop location if that scanning pass addresses that ink drop location and the desired image requires ink at that ink dot location. Further, the vertical direction is the advance direction of the print medium.

In particular, four sequential scanning passes are respectively illustrated in FIGS. 3(a)–3(d), which shows a selected region of the ink drop locations. In this example, a 16 nozzle printhead is shown, represented by the vertical bar with horizontal tick marks to the left of FIGS. 3(a)–3(c). In pass one, six nozzles are used to eject ink drops. Ink drop locations in the six raster lines are addressed using a checkerboard pattern having an interlacing percentage of 50%. Between passes, the print medium is advanced by six units equivalent to the vertical spacing between nozzles. In pass two and subsequent passes (not including the last scanning pass), twelve nozzles are used and ink drop locations are addressed using a checkerboard pattern having an interlacing percentage of 50%. Twelve raster lines are addressed by each respective pass. After pass 3, an image that is printed would have a distinct boundary 36 defined between ink drops ejected by the first pass and ink drops ejected by the third pass. Similarly, a distinct boundary 38 can be defined between ink drops ejected by the second pass and ink drops ejected by the fourth pass.

Figure 4A:
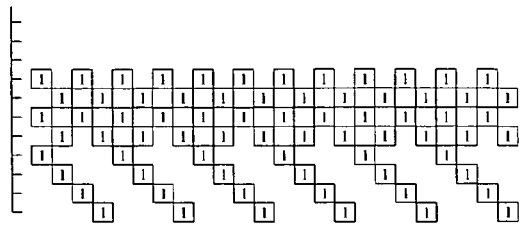
FIGS. 4(a)–4(d) illustrate addressing patterns for successive passes of an ink jet printhead in one embodiment of the invention.
Figure 4B:
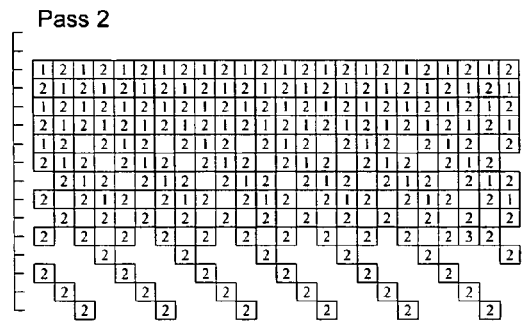
Figure 4C:
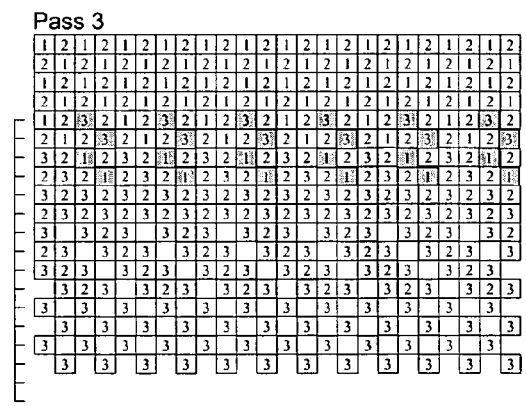

FIGS. 4(a)–4(d) illustrate addressing patterns according to one embodiment of the invention. Again, four scanning passes are illustrated with a 16 nozzle printhead represented by the vertical bar with horizontal tick marks to the left of FIGS. 4(a)–4(c). In pass one, shown in FIG. 4(a), eight nozzles are used and address raster lines 1–8. A first addressing pattern is used for raster lines 1–4, and a second addressing pattern is selected for raster lines 5–8, the lower region of the first printing pass. The interlacing percentage of the first addressing pattern is 50%, and the interlacing percentage of the second addressing pattern is 25%. Between passes, the print medium is advanced by six units equivalent to the vertical spacing between nozzles (or the distance between raster lines). In the second pass, as shown in FIG. 4(b), 14 nozzles are used to address raster lines 1–14, and a checkerboard addressing pattern is selected for raster lines 1–10, and a different addressing pattern is selected for raster lines 11–14. In particular, the interlacing percentage of the checkerboard pattern is 50% and the interlacing percentage of the addressing pattern for lines 11–14 of the second pass is 25%. After the second pass, the print medium is again advanced. In the third pass, as shown in FIG. 4(c), 16 nozzles are used to address the 16 raster lines beginning with raster line 5 (although FIG. 4(c) only illustrates the raster lines 5–18). In the third pass, an addressing pattern having an interlacing percentage of 25% is used for raster lines 5–10 (the upper region of the third scanning pass) and an addressing pattern having an interlacing percentage of 50% is used for raster lines 11–18.

After the third pass, all ink drop locations in the raster lines addressed by the first scanning pass (i.e., raster lines 1–8) have been addressed by the prior scanning passes. An overlapping boundary region 40 comprising four raster lines is defined between ink drop locations addressed by the first pass and ink drop locations addressed by the third pass. No distinct boundary is apparent between the first and the third scanning passes.

Figure 4D:
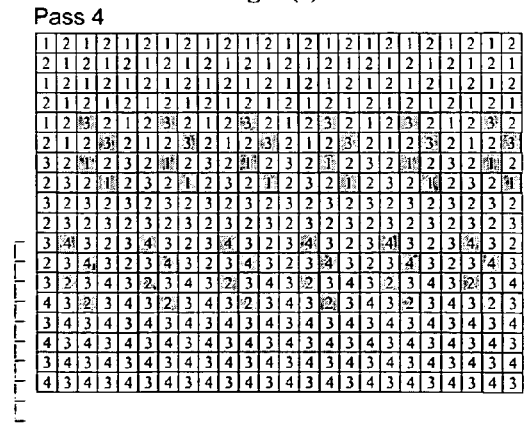

After the third pass, the print medium is advanced, and a fourth printing pass addresses the 16 raster lines beginning with raster line 11 (although FIG. 4(d) only illustrates the raster lines 11–18). In the fourth pass, a pattern having an interlacing percentage of 25% is selected for raster lines 11–14, and a pattern having an interlacing percentage of 50% is selected for raster lines 15–18. More generally, considering the ink drop locations including those not shown in FIG. 4(d), an interlacing percentage of 25% is selected for raster lines 11–14, an interlacing percentage of 50% is selected for raster lines 15–22, and an interlacing percentage of 25% is selected for raster lines 23–26.

After the fourth pass, all ink drop locations in the raster lines addressed by the second scanning pass (i.e., raster lines 1–14) have been addressed by the prior scanning passes. An overlapping boundary region 42 is defined between ink drop locations addressed by the second pass and ink drop locations addressed by the fourth pass.

Figure 5A:
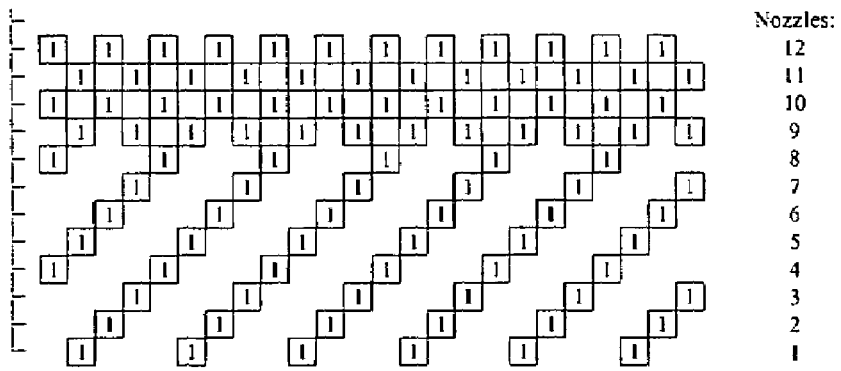
FIGS. 5(a)–5(c) illustrate addressing patterns for successive passes of an ink jet printhead in another embodiment of the invention.
Figure 5B:
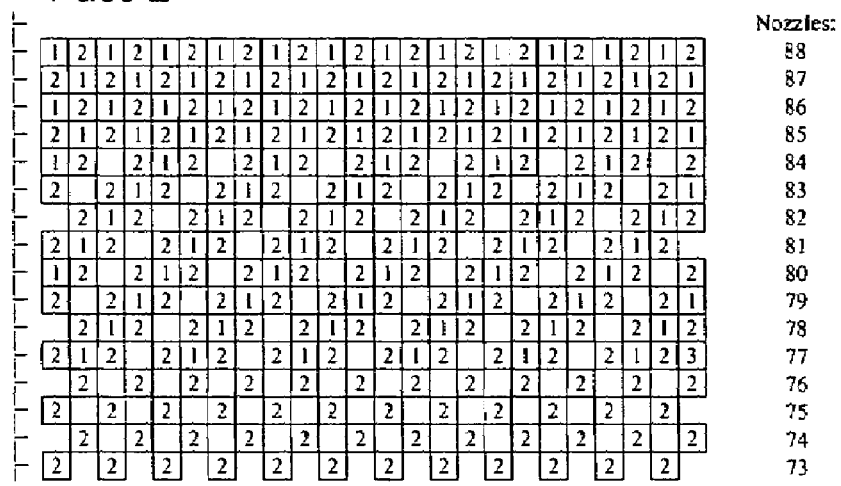
Figure 5C:
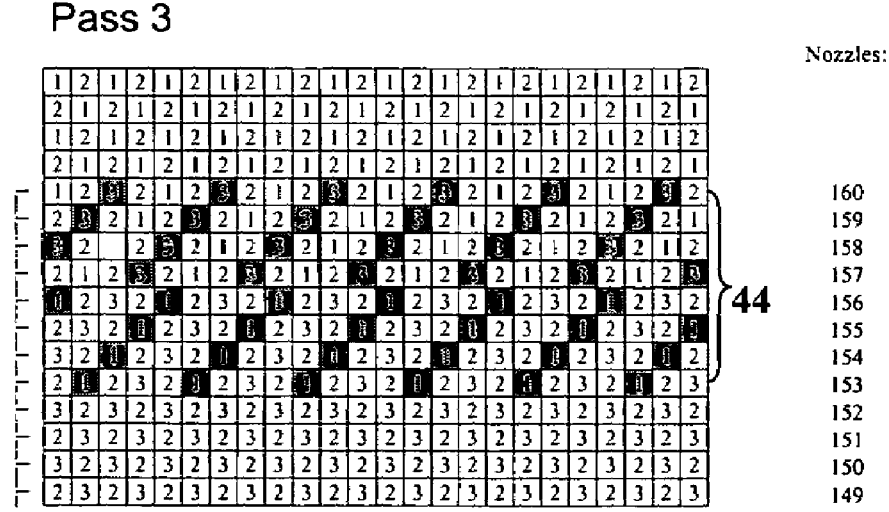

FIGS. 5(a)–5(c) illustrate addressing patterns according to another embodiment of the invention. Here, three scanning passes are illustrated for a selected region of the ink drop locations. In this example, a 160 nozzle printhead is used, represented by the vertical bar with horizontal tick marks to the left of the figure. Nozzle numbers are shown to the right for each pass. In pass one, twelve nozzles are used and address raster lines 1–12. A first addressing pattern is selected for raster lines 1–4, and a second addressing pattern is selected for raster lines 5–12. In particular, the interlacing percentage of the first addressing pattern is 50%, and the interlacing percentage of the second addressing pattern is 25%. Between passes, the print medium is advanced by 76 units. In the second pass, 16 nozzles (nozzles 73–88) are used to address raster lines 1–16, and a checkerboard pattern having an interlacing percentage of 50% is selected for raster lines 1–16. After the second pass, the print medium is again advanced. In the third pass, 12 nozzles are used to address raster lines 5–16, and a pattern having an interlacing percentage of 25% is used for raster lines 5–12 and a pattern having an interlacing percentage of 50% is selected for raster lines 13–16.

After the third pass, all ink drop locations in the raster lines addressed by the first scanning pass (i.e., raster lines 1–12) have been addressed by the prior scanning passes. An overlapping boundary region 44 is defined between ink drop locations addressed by the first pass and ink drop locations addressed by the third pass. This overlapping boundary region 44 comprises eight raster lines.

Figure 6A:
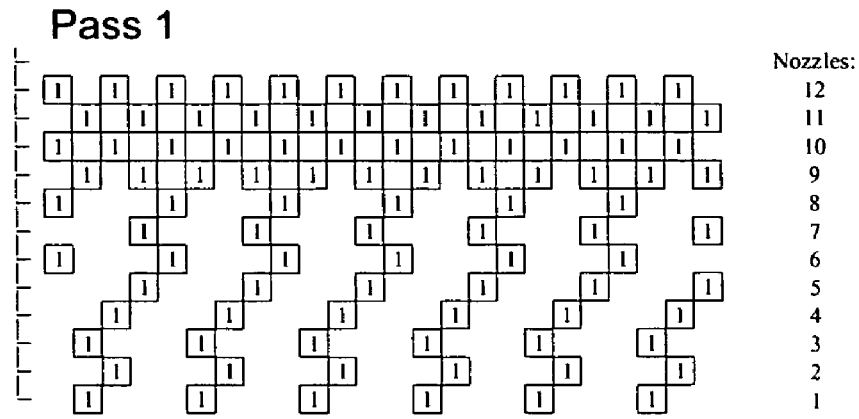
FIGS. 6(a)–6(c) illustrate addressing patterns for successive passes of an ink jet printhead in another embodiment of the invention.
Figure 6B:
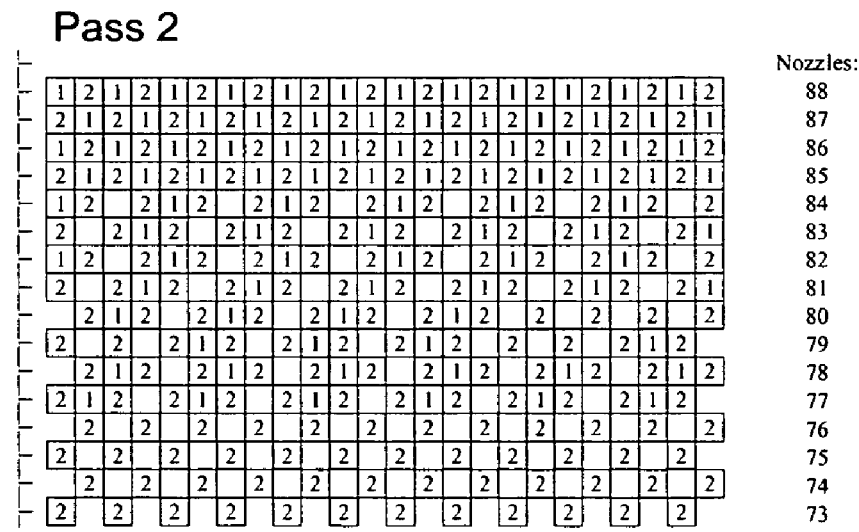
Figure 6C:
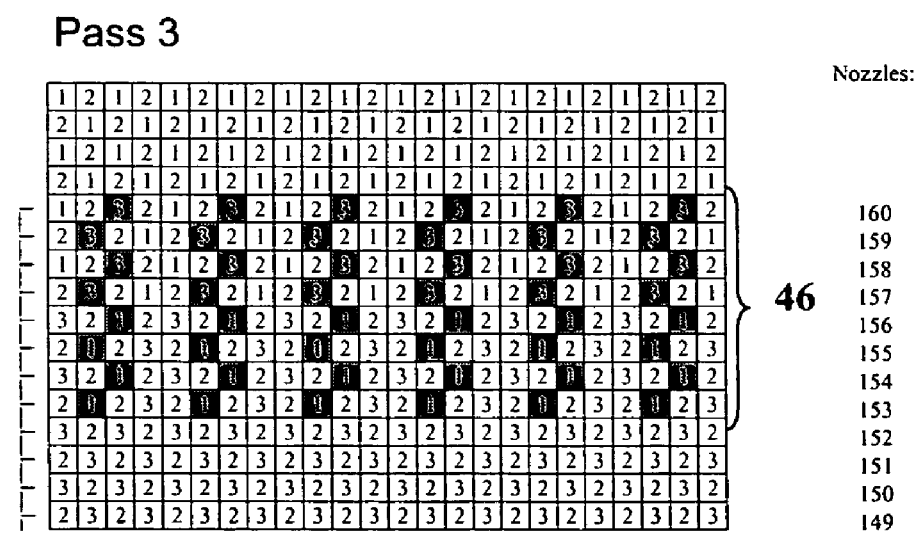

FIGS. 6(a)–6(c) illustrate addressing patterns according to another embodiment of the invention. Here, three scanning passes are illustrated for a selected region of the ink drop locations. Again, a 160 nozzle printhead is used, represented by the vertical bar with horizontal tick marks to the left of the figure, and nozzle numbers are shown to the right for each pass. In pass one, twelve nozzles are used and address raster lines 1–12. A first addressing pattern is selected for raster lines 1–4, and a second addressing pattern is selected for raster lines 5–12. In particular, the interlacing percentage of the first addressing pattern is 50%, and the interlacing percentage of the second addressing pattern is 25%. Note that the second addressing pattern for the first pass illustrated in FIG. 6(a) is different than the second addressing pattern for the first pass illustrated in FIG. 5(a), even though each has the same interlacing percentage.

Many different patterns can be conceived which have a given interlacing percentage. An addressing pattern may be selected for a plurality of raster lines as a whole. An addressing pattern may be selected that is repeated for each of a plurality of raster lines but with a different starting point. But an addressing pattern for a portion of raster lines does not have to be the same for each of those raster lines. For example, a pattern having a 50% interlacing percentage in four raster lines can be achieved by addressing 25% of the ink dot locations in two of the raster lines and 75% of the ink dot locations in the remaining lines. Or, two of the raster lines can address 100% of the ink dot locations, and two of the raster lines can address 0% of the ink dot locations. Further, the patterns may appear "pseudo-random", in that the repeating pattern may be difficult to discern.

Between passes represented in FIGS. 6(a)–6(c), the print medium is advanced by 76 units. In the second pass, 16 nozzles are used to address raster lines 1–16, and a checkerboard pattern having an interlacing percentage of 50% is selected for raster lines 1–16. After the second pass, the print medium is again advanced. In the third pass, 12 nozzles are used to address raster lines 5–16, and a pattern having an interlacing percentage of 25% is selected for raster lines 5–12 and a pattern having an interlacing percentage of 50% is selected for raster lines 13–16.

After the third pass, all ink drop locations in the raster lines addressed by the first scanning pass (i.e., raster lines 1–12) have been addressed by the prior scanning passes. An overlapping boundary region 46 is defined by the first pass and the third pass. This overlapping boundary region 46 comprises eight raster lines.

Figure 7A:
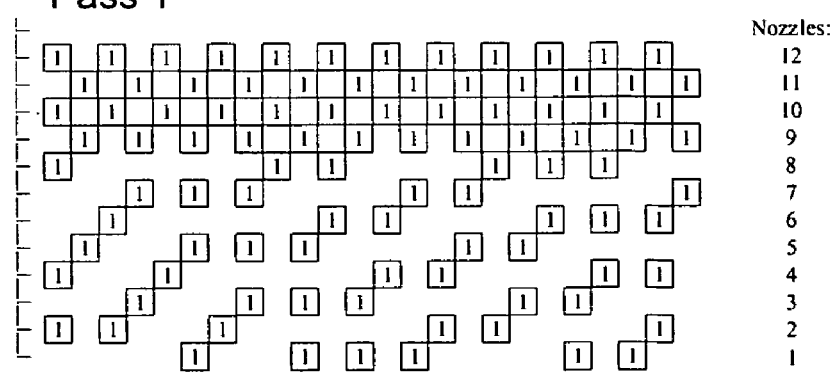
FIGS. 7(a)–7(c) illustrate addressing patterns for successive passes of an ink jet printhead in another embodiment of the invention.
Figure 7B:
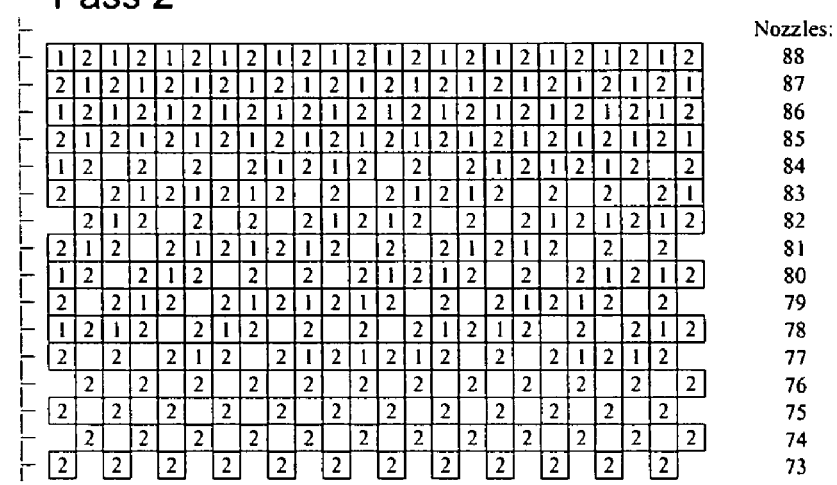
Figure 7C:
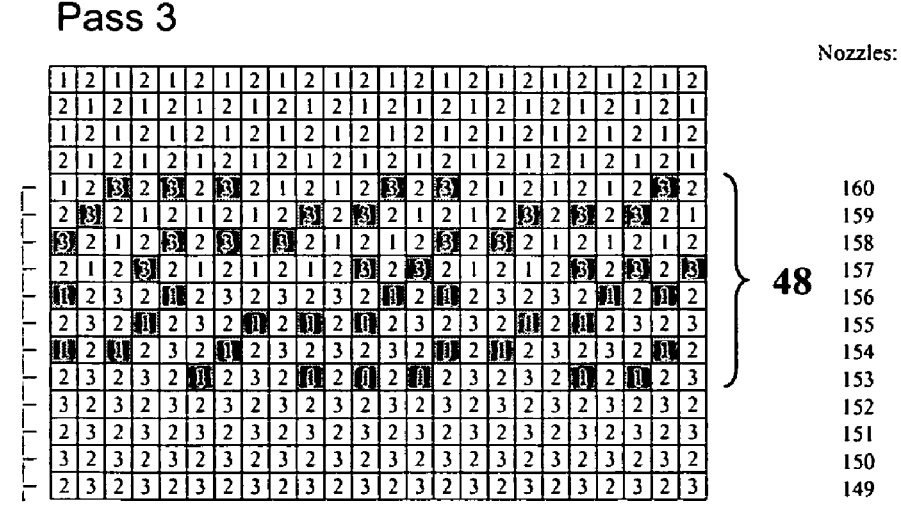

FIGS. 7(a)–7(c) illustrate variations of the interlacing patterns illustrated with respect to FIGS. 5 and 6. Here, three scanning passes are illustrated for a selected region of the ink drop locations. Again, a 160 nozzle printhead is used, represented by the vertical bar with horizontal tick marks to the left of the figure, and nozzle numbers are shown to the right for each pass. In pass one, twelve nozzles are used and address raster lines 1–12. A first addressing pattern having an interlacing percentage of 50% is selected for raster lines 1–4, and a second addressing pattern having an interlacing percentage of 25% is selected for raster lines 5–12. The second pattern appears pseudo-random, but nonetheless, has an interlacing percentage of 25%. Instead of a selecting a first ink dot location, and then addressing every fourth ink dot location, the pattern for a raster line is derived by addressing every other ink dot location in the following manner: one on, three off, two on, two off, three on, one off, as shown in raster line 5. The starting point of this raster line pattern varies in each subsequent raster line.

Between passes, the print medium is advanced by 76 units. In the second pass, 16 nozzles are used to address raster lines 1–16, and a checkerboard pattern having an interlacing percentage of 50% is selected for raster lines 1–16. After the second pass, the print medium is again advanced. In the third pass, 12 nozzles are used to address raster lines 5–16, and a somewhat random looking pattern having an interlacing percentage of 25% is selected for raster lines 5–12 and a checkerboard pattern having an interlacing percentage of 50% is selected for raster lines 13–16.

After the third pass, all ink drop locations in the raster lines addressed by the first scanning pass (i.e., raster lines 1–12) have been addressed by the prior scanning passes. An overlapping boundary region 48 is defined between ink drop locations addressed by the first pass and ink drop locations addressed by the third pass. This overlapping boundary region 48 comprises eight raster lines.

Figure 8A:
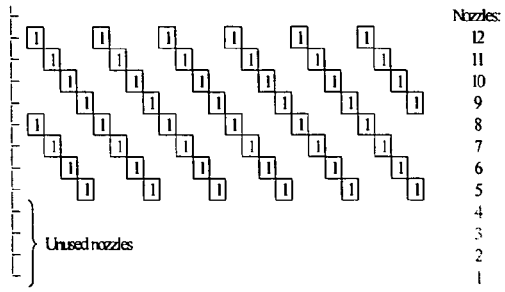
Figure 8B:
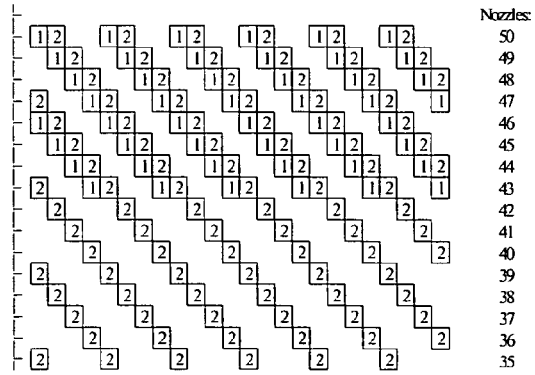
Figure 8C:
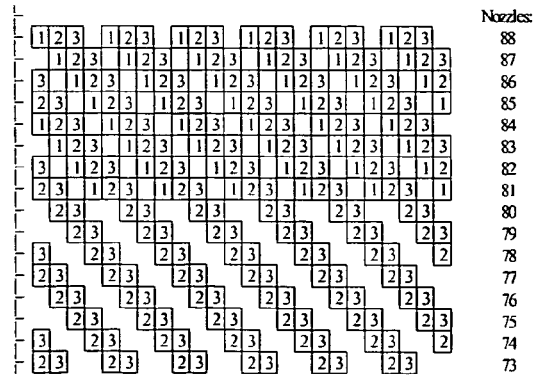
Figure 9A:
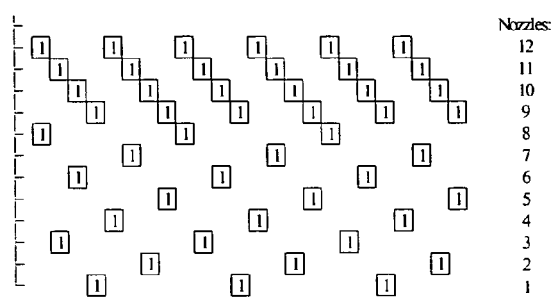
Figure 9B:
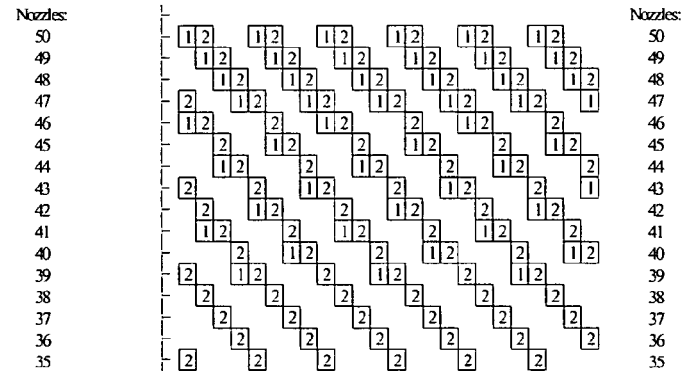
Figure 9C:
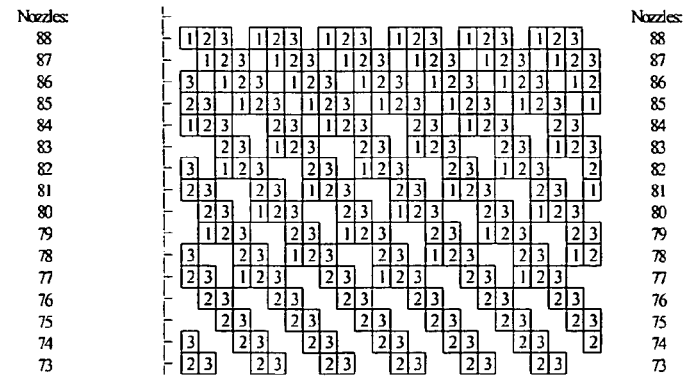
Figures 8D, 8E, 9D, 9E:
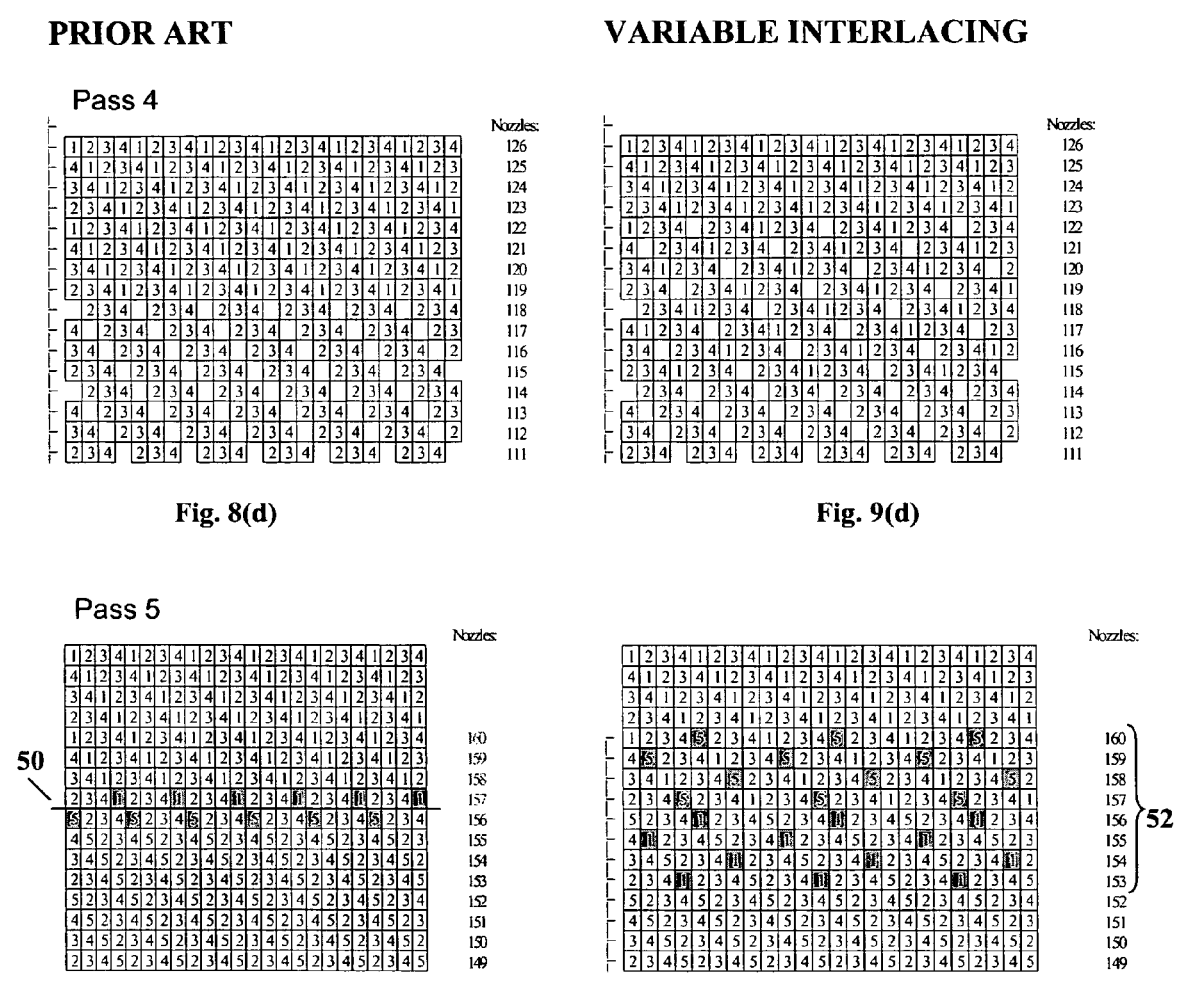

Another embodiment of the invention is best understood by comparison to prior art addressing patterns. In particular, FIGS. 8(a)–8(e) illustrate prior art addressing patterns for printing in a series of scanning passes and selectively ejecting ink from the nozzles. In particular, five sequential scanning passes are illustrated in respective FIGS. 8(a)–8(e), which show a selected region of the ink drop locations. In this example, a 160 nozzle printhead is used, represented by the vertical bar with horizontal tick marks to the left of the figure. Nozzle numbers are shown to the right for each pass. In pass one, eight nozzles are used to eject ink drops by addressing raster lines 1–8, and an addressing pattern having a 25% interlacing percentage is used for the eight raster lines. Between passes, the print media is advanced by 38 units. In passes two through four, sixteen nozzles are used and address raster lines 1–16 with a corresponding pattern having an interlacing percentage of 25%. Four scanning passes are needed to address each ink drop location in each raster line. After the fifth pass, as shown in FIG. 8(e), a printed image would have a boundary 50 defined between ink drops printed by the first pass and ink drops printed by the fifth pass.

FIGS. 9(a)–9(e) illustrate addressing patterns according to another embodiment of the invention. Again, five sequential scanning passes are illustrated for a selected region of ink drop locations. Again, a 160 nozzle printhead is used, represented by the vertical bar with horizontal tick marks to the left of the figure and nozzle numbers are shown to the right for each pass. In pass one, twelve nozzles are used and address raster lines 1–12. A first pattern having an interlacing percentage of 25% is selected for raster lines 1–4, and a second pattern having an interlacing percentage of 12.5% is selected for raster lines 5–12. Between passes, the print medium is advanced 38 units. In the second pass, 16 nozzles are used to address raster lines 1–16, and a pattern having an interlacing percentage of 25% is selected for raster lines 1–16. In the third pass, 16 nozzles are used to address raster lines 1–16, and a pattern having an interlacing percentage of 25% is selected for raster lines 1–16. In the fourth pass, 16 nozzles are used to address raster lines 1–16, and a pattern having an interlacing percentage of 25% is selected for raster lines 1–16. In the fifth pass, 12 nozzles are used to address raster lines 5–16, and a pattern having an interlacing percentage of 12.5% is used to address raster lines 5–12, and a pattern having an interlacing percentage of 25% is used to address at least raster lines 13–16.

After the fifth pass, all ink drop locations in the raster lines addressed by the first scanning pass (i.e., raster lines 1–12) have been addressed by the prior scanning passes. An overlapping boundary region 52 is defined between ink drop locations addressed by the first pass and ink drop locations addressed by the fifth pass. This overlapping boundary region 52 comprises eight raster lines.

Figure 10A:
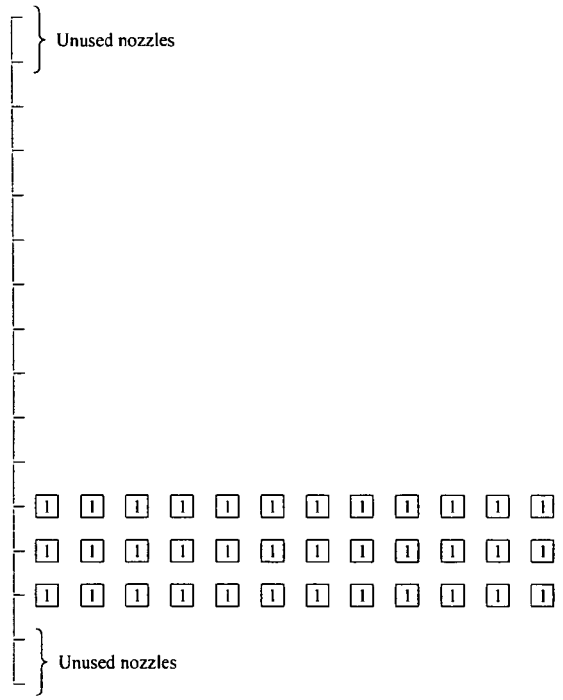
Figure 11A:
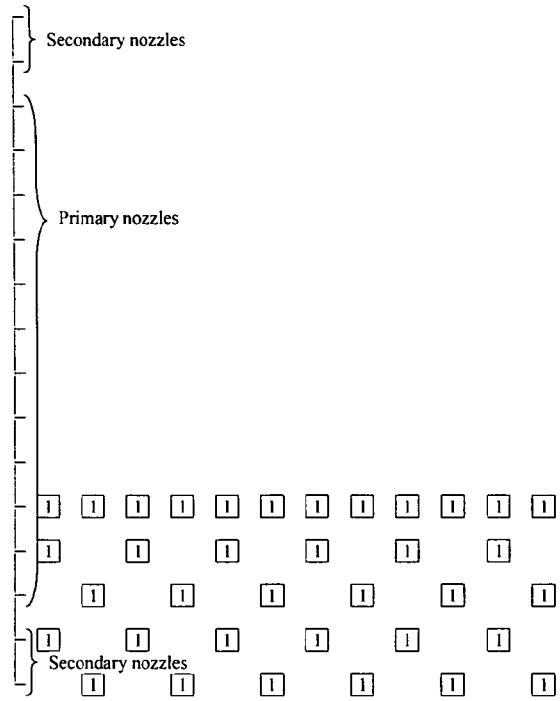
Figure 10B:
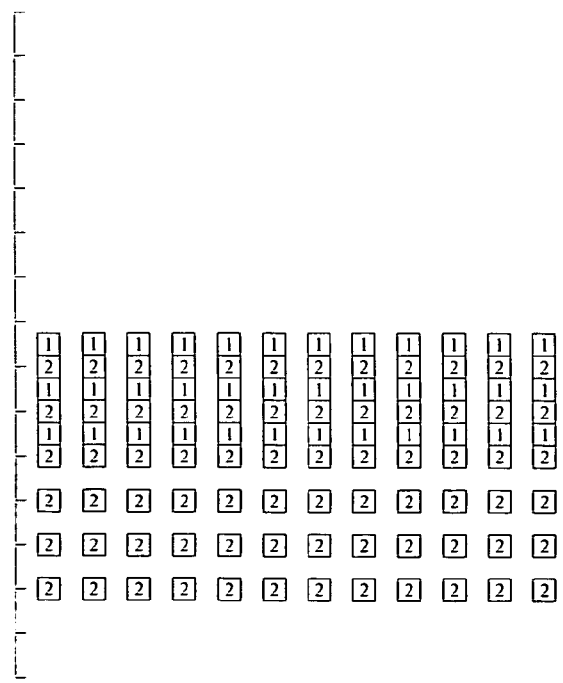
Figure 11B:
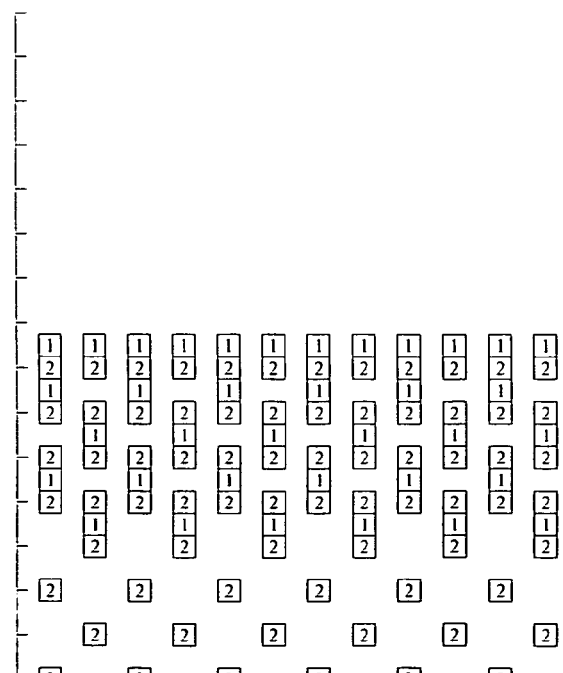
Figure 10C:
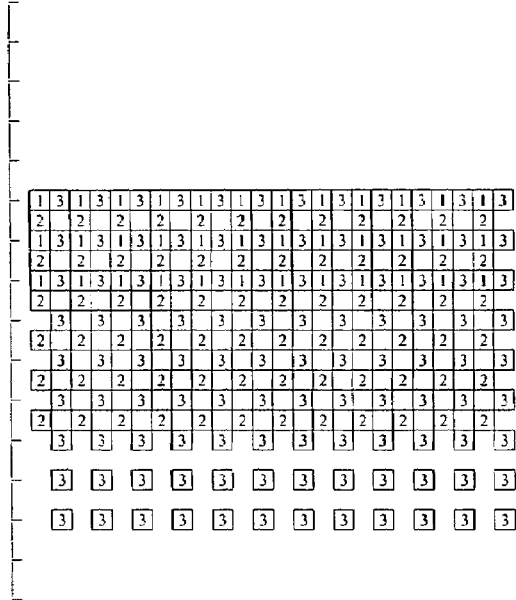
Figure 11C:
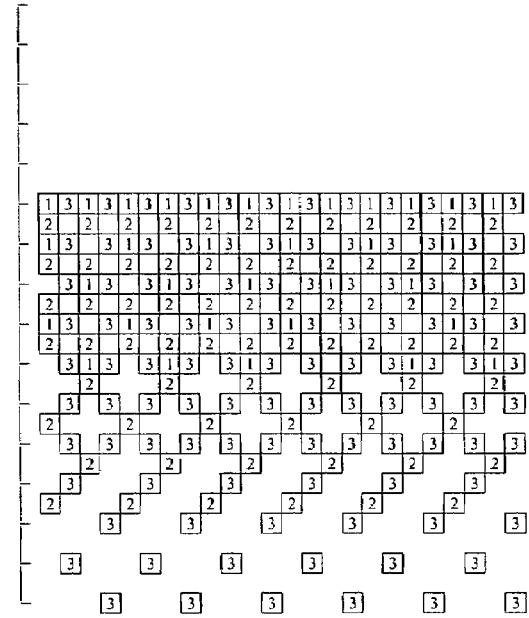
Figure 10D:
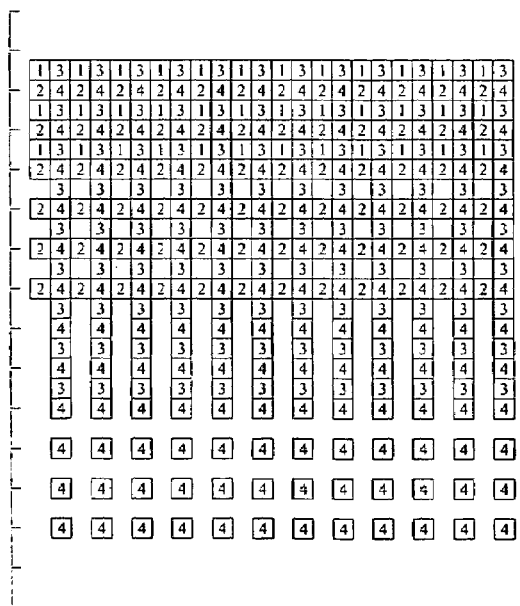
Figure 11D:
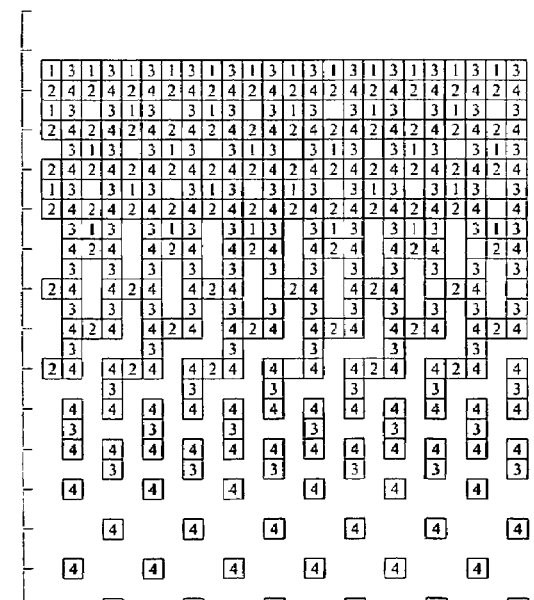

A further embodiment of the invention is best understood by comparison to prior art methods. In particular, FIGS. 10(a)–10(h) illustrate prior art methods for printing in a series of scanning passes and selectively ejecting ink from the nozzles. This example represents four pass printing at a resolution such as 1200 by 1200 dpi, for example, using a printhead having 16 nozzles vertically spaced at $\frac{1}{600}$ inch intervals, and activated at horizontal distances of $\frac{1}{600}$ inch. In such a traditional addressing scheme, four passes are required to address all ink dot locations to achieve 1200 by 1200 dpi resolution. In particular, eight sequential scanning passes are illustrated in respective FIGS. 10(a)–10(h). As shown in FIG. 10(a), odd 1200ths are horizontally addressed in the odd raster lines addressed in the first scanning pass. After the first scanning pass, the print media is advanced by $\frac{7}{1200}$ inches. In scanning pass two, odd 1200ths are horizontally addressed in the even raster lines addressed by the second scanning pass. After the second scanning pass, the print media is advanced by $\frac{5}{1200}$ inches. In scanning pass three, even 1200ths are addressed horizontally in the odd raster lines of the third scanning pass. In scanning pass four, even 1200ths are addressed horizontally in the even raster lines of the fourth scanning pass. Four scanning passes are needed to address each ink drop location in each raster line addressed by the first scanning pass and any raster lines in between. A boundary 54 defined between ink drops printed by the first scanning pass and ink drops printed by the fifth scanning pass. Scanning passes five, six, seven and eight are also illustrated. As shown in FIG. 10(*h*), a boundary 56 is also defined between ink drops printed by the second and the sixth scanning passes, a boundary 58 is defined between the third and seventh scanning passes, and a boundary 60 is defined between the fourth and eight scanning passes.

FIGS. 11(*a*)–11(*h*) illustrate addressing patterns according to another embodiment of the invention. Again, eight sequential scanning passes are illustrated. In scanning pass one, five nozzles are used to address specified ink drop locations in odd raster lines from 1–10. In other words, nozzles pass over raster lines 1, 3, 5, 7, and 9. For the nozzle that passes over raster line 1, a first addressing pattern having an interlacing percentage of 50% is selected, since every other ink dot location in that raster line is addressed. Similarly, for a respective nozzle that passes over raster lines 3, 5, 7 and 9, every fourth ink drop location is addressed, for an interlacing percentage of 25%. Between scanning passes, the print medium is advanced.

In the second scanning pass, eight nozzles are used to address specified ink drop locations in even raster lines from 1–16. An addressing pattern having an interlacing percentage of 50% is selected for each even raster lines 2, 4, 6, 8 and 10, and a pattern having an interlacing percentage of 25% is selected for raster lines 12, 14 and 16.

In the third pass, eleven nozzles are used to address specified ink drop locations in odd raster lines from 1–22, and a pattern having an interlacing percentage of 50% is selected for odd raster lines 1, 3, 5, 7, 9, 11 and 13, and an addressing pattern having an interlacing percentage of 25% is selected for odd raster lines 15, 17, 19, and 21.

In the fourth pass, fourteen nozzles are used to address specified ink drop locations in even raster lines from 1–28, and an addressing pattern having an interlacing percentage of 50% is selected for raster lines 2, 4, 6, 8, 10, 12, 14, 16, 18, and 20, and an addressing pattern having an interlacing percentage of 25% is selected for raster lines 22, 24, 26, and 28.

In the fifth pass, fourteen nozzles are used to address specified ink drop locations in odd raster lines from 3–29, and an addressing pattern having an interlacing percentage of 25% is used to address raster lines 3, 5, 7, and 9, an addressing pattern having an interlacing percentage of 50% is used to address raster lines 11, 13, 15, 17, 19, 21, 23, and 25, and an addressing pattern having an interlacing percentage of 25% is used to address raster lines 27 and 29.

After the fifth pass, all ink drop locations in the raster lines addressed by the first scanning pass (i.e., raster lines 1–9) have been addressed by the prior scanning passes. An overlapping boundary region is defined between raster lines addressed by the first pass and raster lines addressed by the fifth pass. This overlapping boundary region comprises seven raster lines.

In a sixth pass, eleven nozzles are used to address specified ink drop locations in even raster lines from 10–30. In particular, an addressing pattern having an interlacing percentage of 25% is used to address raster lines 10, 12, 14 and 16, an addressing pattern having an interlacing percentage of 50% is used to address raster lines 18, 20, 22, 24, 26, 28 and 30.

In a seventh pass, eight nozzles are used to address specified ink drop locations in odd raster lines from 15–29. In particular, an addressing pattern having an interlacing percentage of 25% is used to address raster lines 15, 17, 19 and 21, and an addressing pattern having an interlacing percentage of 50% is used to address raster lines 23, 25, 27 and 29.

In an eighth pass, five nozzles are used to address specified ink drop locations in even raster lines from 22–30. In particular, an addressing pattern having an interlacing percentage of 25% is used to address raster lines 22, 24, 26, and 28, and then an addressing pattern having an interlacing percentage of 50% is used to address subsequent raster lines beginning with 30. After the eighth printing pass, overlapping boundary regions 62, 64, 66 and 68 exist between the first and the fifth scanning passes, between the second and the sixth scanning passes, between the third and seventh scanning passes, and between the fourth and eighth scanning passes, respectively.

The amount of interlacing that is chosen for each addressing pattern can vary from the percentages illustrated in the examples given. Preferably, the range in percentage of interlacing used in an addressing pattern is between from about 12.5% to about 50%. Various features and advantages of the invention are set forth in the following claims.

What is claimed is:

1. A method of printing an image on a print medium by ejecting ink from a printhead in an ink jet printer, the printhead having a column of N nozzles on a printhead, where N is an integer greater than eight, for selectively ejecting ink drops onto a printing area of the print medium at a plurality of ink drop locations arranged in a grid, the print medium being movable in an advance direction, the method comprising:

performing a series of at least three scanning passes of the printhead across the print medium, with the print medium being advanced between scanning passes, wherein each scanning pass comprises:

moving the column of nozzles horizontally across the printing area in a plurality of raster lines for selectively addressing ink drop locations according to an addressing pattern for that pass, wherein each ink drop location is addressed in one of the series of scanning passes, and ejecting ink from a nozzle at an ink drop location during a particular scanning pass according to a corresponding desired image data bit and a corresponding bit of the addressing pattern for that scanning pass, using a first scanning pass having a first addressing pattern for a first contiguous portion of the raster lines addressed by the first scanning pass and a second addressing pattern for a second contiguous portion of the raster lines addressed by the first scanning pass, wherein the second portion of the raster lines addressed by the first scanning pass corresponds to a lower region of the first scanning pass, and the first addressing pattern of the first pass has an interlacing percentage that is greater than an interlacing percentage of the second addressing pattern of the first pass;

using a second scanning pass having at least a first addressing pattern used for a first contiguous portion of the raster lines addressed by the second scanning pass; and, using the at least third scanning pass having a first addressing pattern for a first contiguous portion of the raster lines addressed by the at least third scanning pass and a second addressing pattern for a second contiguous portion of raster lines addressed by the at least third scanning pass, wherein the first portion of the raster lines addressed by the at least third scanning pass corresponds to an upper region of the at least third scanning pass, and the first addressing pattern of the at least third pass has an interlacing percentage that is less than an interlacing percentage of the second addressing pattern of the at least third pass, and further wherein the at least third scanning pass together with the prior scanning passes have addressed each ink drop location in the plurality of raster lines addressed by the first scanning pass, and the first scanning pass and the at least third scanning pass define an overlapping boundary region of raster lines.

2. The method of claim 1, wherein the overlapping boundary region is selected from a group comprising at least four raster lines, at least six raster lines and at least eight raster lines.

3. The method of claim 1, wherein the at least third scanning pass is the third scanning pass.

4. The method of claim 3, further comprising at least four scanning passes wherein the second scanning pass and the fourth scanning pass also define another overlapping boundary region, and wherein the fourth scanning pass together with the prior scanning passes have addressed each ink drop location in the raster lines addressed by the second scanning pass.

5. The method of claim 1, wherein the at least third scanning pass is the fourth scanning pass.

6. The method of claim 1, wherein the interlacing percentage of the second addressing pattern of the first scanning pass and the first addressing pattern of the at least third scanning pass is 25% and the interlacing percentage of the first addressing pattern of the first scanning pass and the second addressing pattern of the at least third scanning pass is 50%.

7. The method of claim 1, wherein there are at least eight scanning passes, and the overlapping boundary region is defined between the first and the fifth scanning passes.

8. The method of claim 7, wherein an overlapping boundary region is defined between the second and the sixth scanning passes, between the third and the seventh scanning passes, and between the fourth and the eighth scanning passes.

9. A printer apparatus for printing an image on a print medium, comprising:
   a printhead including a column of N nozzles for ejecting ink onto a printing areas at a plurality of ink drop locations arranged in a grid, where N is an integer greater than eight;
   a horizontal scan drive for reciprocally moving the printhead horizontally across the print medium;
   a vertical scan drive for moving the print medium vertically; and
   a controller for controlling the horizontal scan drive, the vertical scan drive, and the printhead, the controller storing desired image data and operative to perform a series of at least three scanning passes of the printhead with the print medium being advanced between scanning passes, wherein each scanning pass comprises moving the column of nozzles across the printing area in a plurality of raster lines for selectively addressing ink drop locations according to an addressing pattern, wherein each ink drop location is addressed in one of the series of scanning passes, and ink is ejected from a nozzle at an ink drop location during a particular scanning pass according to a corresponding desired image data bit and a corresponding bit of the addressing pattern for that scanning pass, the controller using for the first scanning pass a first addressing pattern for a first contiguous portion of the raster lines addressed by the first scanning pass and a second addressing pattern for a second contiguous portion of the raster lines addressed by the first scanning pass, wherein the second portion of the raster lines addressed by the first scanning pass corresponds to a lower region of the first scanning pass, and the first addressing pattern of the first scanning pass has an interlacing percentage that is greater than an interlacing percentage of the second addressing pattern of the first scanning pass, the controller also using for the at least third scanning pass a first addressing pattern for a first contiguous portion of the raster lines addressed by the at least third scanning pass and a second addressing pattern for a second contiguous portion of raster lines addressed by the at least third scanning pass, wherein the first portion of the raster lines addressed by the at least third scanning pass corresponds to an upper region of the at least third scanning pass, and the first addressing pattern of the at least third pass has an interlacing percentage that is less than an interlacing percentage of the second addressing pattern of the at least third scanning pass, and wherein the at least third scanning pass together with prior scanning passes have addressed each ink drop location in the plurality of raster lines addressed by the first scanning pass, and the first scanning pass and the at least third scanning pass define an overlapping boundary region.

10. The apparatus of claim 9, wherein for each scanning pass, the controller uses different addressing patterns for a first portion of raster lines and a second portion of raster lines addressed by that scanning pass, and each scanning pass defines an overlapping boundary region with another scanning pass.

11. The apparatus of claim 9, wherein the at least third scanning pass is the third scanning pass.

12. The apparatus of claim 9, wherein the second scanning pass and an at least fourth scanning pass also define another overlapping boundary region, and wherein the at least fourth scanning pass together with the prior scanning passes have addressed each ink drop location in the raster lines addressed by the second scanning pass.

13. The apparatus of claim 12, wherein the at least fourth scanning pass is the fourth scanning pass.

14. The apparatus of claim 9, wherein the interlacing percentage of the second addressing pattern of the first scanning pass and the first addressing pattern of the at least third scanning pass is 25% and the interlacing percentage of the first addressing pattern of the first scanning pass and the second addressing pattern of the at least third scanning pass is 50%.

15. The apparatus of claim 9, wherein there are at least eight scanning passes, and the overlapping boundary region is defined between the first and the fifth scanning passes.

16. The apparatus of claim 15, wherein overlapping boundary regions are defined between the second and the sixth scanning passes, between the third and the seventh scanning passes, and between the fourth and the eighth scanning passes.

* * * * *